March 4, 1924.
G. GARDNER
VERTICAL STABILIZER
Filed March 29, 1923
1,485,783
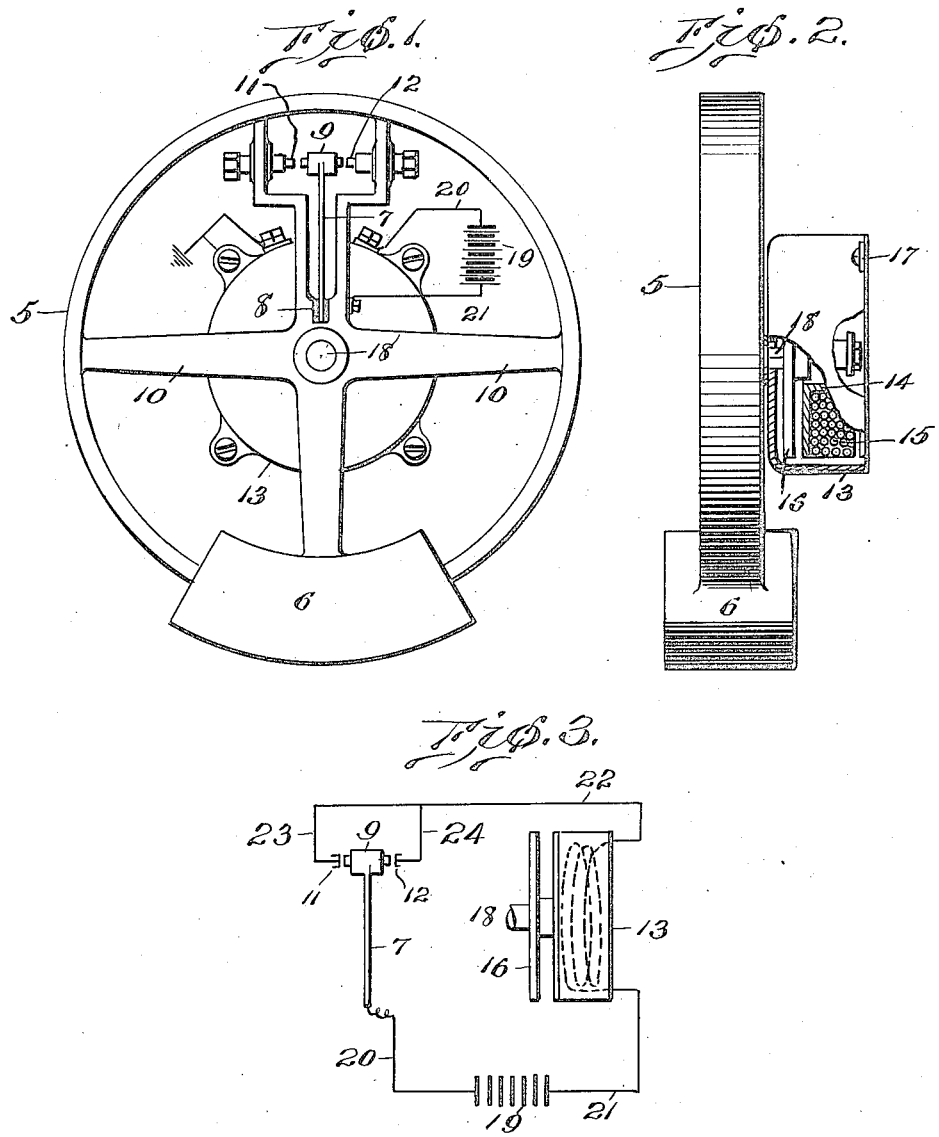
Inventor
Grandison Gardner
By Robert H. Young
Attorney Patented Mar. 4, 1924.

1,485,783

UNITED STATES PATENT OFFICE.

GRANDISON GARDNER, OF DAYTON, OHIO.

VERTICAL STABILIZER.

Application filed March 29, 1923. Serial No. 628,665.

*To all whom it may concern:*

Be it known that I, GRANDISON GARDNER, a citizen of the United States, residing at Dayton, in the county of Montgomery and State of Ohio, have invented certain new and useful Improvements in Vertical Stabilizers, of which the following is a specification.

This invention relates to vertical stabilizers for use in any desired connection as for example, operating the controls of aircraft.

The object of the invention is to produce a stabilizer of the pendulum type which will not be affected by the accelerations of an airplane or other type of aircraft, or any vehicle or object upon which the stabilizing mechanism is mounted.

With the above and other objects in view the invention consists in the novel construction, combination and arrangement herein fully described, illustrated and claimed.

In the accompanying drawings,

Figure 1 is a side elevation of the vertical stabilizer of this invention.

Figure 2 is an edge view of the same partly in section.

Figure 3 is a diagram of the wiring system.

Referring to the drawings, 5 designates a balance wheel which is stabilized by a pendulous weight 6 as clearly shown in Figure 1, the function of the weight being to maintain a vertical line through the axis of the wheel. Thus far the mechanism has exactly the same action as a simple pendulum.

Extending from the hub of the wheel 5 and having an insulated connection therewith is a flexible or spring arm 7, the inner end of which is embedded in insulating material 8 in the hub of the wheel and the outer end of which carries a double ended electric contact 9. The wheel 5 is shown as having spokes 10 and one of said spokes is bifurcated as shown at the top of Figure 1 and the branches thereof are provided with adjustable contacts 11 and 12 which lie opposite the movable contact 9, the arm 7 lying within the contour of the bufurcated spoke as clearly shown.

At one side of the balance wheel 5 there is arranged a magnetic clutch comprising a housing or casing 13. Within said housing is an electromagnet embodying a core 14 and a coil 15 surrounding the core, while opposite one face of the magnet is a clutch disk 16 of suitable material to be attracted by the magnet. The casing is adapted to be fastened to any stationary part of an airplane by fastening means 17.

In securing the device to an airplane for example, the balance wheel is so arranged that the accelerations are in a line to a right angle to the flexible or spring arm 7. When no acceleration is being felt by the instrument it acts in exactly the same manner as a simple pendulum but should accelerations be experienced the arm 7 is flexed, which action causes the contacts 9 and 11 or 12 to touch one another, thereby closing an electric circuit. This energizes the magnetic clutch which, due to the fact that the disk 16 is keyed to the shaft 18 of the wheel 5, which shaft is in turn pressed firmly into said wheel, prevents any movement of the weight 6 until the clutch is released by counter-acceleration of the vehicle upon which the device is mounted. The mechanism in other words, reduces a pendulum to a fixed body during accelerations and releases it again as soon as accelerations cease. The main feature of the device resides in the pendulum lock and it will be observed that the device has practically no moveable or mechanical parts, permitting the use of a simple pendulum which is stable if not accelerated but suspends the action of the pendulum during any acceleration. The circuit controling the magnetic clutch is shown in Figure 3 as comprising a battery 19 from which a wire 20 leads to the arm 7, carrying the contact 9. Another wire 21 leads from the battery to the magnetic clutch, from which a wire 22 leads by means of branches 23 and 24 to the contacts 11 and 12. Thus the movement of the contact 9 in either direction closes the electric circuit, attracts the disk 16 and reduces the pendulous body to a fixed body.

I claim:

1. In a vertical stabilizer, a pendulum, a magnetic clutch adapted when energized to lock the pendulum against movement, a resilient arm on the pendulum, electrical contacts on said arm and pendulum, and an electric circuit in which said contact and magnetic clutch are included.

2. In a vertical stabilizer, a pendulum, a magnetic clutch adapted when energized to lock the pendulum against movement, a resilient arm on the pendulum, sensitive to accelerations, and electrical contacts on said arm and pendulum brought into contact by accelerations, said contacts and magnetic clutch being included in the same circuit.

3. In a vertical stabilizer, a balance wheel, a pendulous weight thereon, opposite electrical contacts on said wheel, a flexible arm on said wheel having a contact head lying between the first named contacts and sensitive to accelerations, a magnetic clutch adapted to lock said wheel against turning movement, and an electric circuit having said arm, contacts and magnetic clutch included therein.

In testimony whereof I affix my signature.

GRANDISON GARDNER.